UNITED STATES PATENT OFFICE 1,993,375

PRODUCTION AND PURIFICATION OF SULPHONATED PRODUCTS

Martin Luther, Mannheim, and Adolf v. Friedolsheim, Ludwigshafen-on-the-Rhine, Germany, assignors to I. G. Farbenindustrie Aktiengesellschaft, Frankfort-on-the-Main, Germany No Drawing. Application June 30, 1933, Serial No. 678,470. In Germany July 7, 1932

8 Claims. (Cl. 260—99.12)

The present invention relates to the production and purification of sulphonated products.

It has already been proposed to prepare valuable assistants in the textile and related industries by subjecting alcohols of high molecular weight, containing more than 10 carbon atoms, to the action of sulphonating agents, such as concentrated sulphuric acid, fuming sulphuric acid, or chlorosulphonic acid, if desired in the presence of agents capable of removing water, such as organic acid anhydrides, for example acetic anhydride, and/or of inert diluents, such as carbon tetrachloride, diethyl ether and the like. Valuable products are certainly obtained in this way when the alcohols which are subjected to the said sulphonation are in a comparatively pure state; however, more or less important difficulties may arise when the alcohols employed as initial materials are not in a pure state, but mixed with other organic substances. Mixtures of this kind are obtained more particularly in the liquid phase oxidation of aliphatic hydrocarbons of high molecular weight, for example according to the process described in the application Ser. No. 237,983, filed December 5, 1927. Such liquid phase oxidation products usually consist of mixtures of alcohols containing from 10 to 25 carbon atoms, with non-oxidized initial hydrocarbons, and products other than alcohols, produced by the said liquid phase oxidation, for example acids, esters, aldehydes, ketones, lactones, estolides and the like. The sulphonation of these latter products is usually not so easily performed as that of the alcohols; moreover, the products obtained by the sulphonation of the substances other than alcohols do not exert the valuable properties of the alcohol sulphonates. From a technical point of view it is rather difficult to free the alcohols from the other non-saponifiable constituents; moreover, this purification can usually be performed only with a loss of alcohols.

We have now found that most valuable assistants in the textile and related industries, more particularly excellent wetting, washing and deterging agents can be obtained by subjecting alcohols containing from 10 to 25, preferably from 12 to 20, carbon atoms in their molecule to the action of a sulphonating agent, if desired after removal of any acid, i. e., saponifiable constituents originally admixed with said alcohols, neutralizing the products resulting from said sulphonation by means of caustic alkalies, preferably by means of concentrated aqueous solutions of caustic soda or potash, mixing the resulting crude neutralized product with water and incorporating the aqueous mixture with a water-soluble solvent selected from the group consisting of alcohols and ketones, containing from 1 to 3 carbon atoms, that means with ethyl, methyl, propyl or isopropyl alcohols or acetone, and subjecting the whole aqueous-alcoholic or aqueous-acetonic mixture to extraction with liquid hydrocarbons or chlorinated liquid hydrocarbons having a boiling point below 200° C., thereby freeing the neutralized sulphonated products from non-sulphonated and non-sulphonatable matter.

The initial materials suitable for the sulphonation comprise for example the alcohol containing mixtures obtainable for example according to the application Ser. No. 433,840, filed March 6th, 1930, by catalytic reduction or hydrogenation of aliphatic monocarboxylic acids and esters thereof, such as fatty oils, fats and waxes, for example esters of oleic, linoleic or train oil acids, cotton seed, sunflower seed acids, and the like, as well as the free acids themselves, these hydrogenation products usually containing, besides alcohols of high molecular weight, free fatty acids, esters, aldehydes, ketones and the like. Suitable initial materials may also be obtained by the liquid phase oxidation of aliphatic hydrocarbons of high molecular weight, such as paraffin wax, paraffin oil and Montan wax, these oxidation products being, if so desired, subjected, prior to sulphonation, to a catalytic reduction by means of hydrogen, for example according to Ser. No. 486,280, filed October 3, 1930. Suitable initial materials for the sulphonation also comprise single, saturated and unsaturated, aliphatic alcohols having the aforesaid number of carbon atoms, such as dodecyl, cetyl or oleyl alcohols.

The said hydrocarbons suitable for the extraction comprise, for example, normal pentane, hexane, heptane, octane, nonane, decane and undecane, and the different isomers of said normal aliphatic liquid hydrocarbons, and especially the technical mixtures of such hydrocarbons, such as petrol ether, ligroin and gasoline fractions having a boiling point below 200° C. Gasoline fractions boiling between about 60° and about 100° C. are preferably employed. Unsaturated liquid hydrocarbons boiling below 200° C. may also be employed, for example amylene, hexylene, heptylene, octylene, nonylene, decylene or undecylene as well as aromatic hydrocarbons, such as benzene and toluene. Suitable chlorinated liquid hydrocarbons comprise for example trichlorethylene and carbon tetrachloride.

The extraction is usually carried out at temperatures between about 15° C. and about the boiling point of the mixture formed by the said extracting hydrocarbons or chlorinated hydrocarbons and the alcohol or acetone, and the aqueous mixture of the neutralized sulphonated products. Temperatures ranging between 40° and about 80° C. are, however, preferably employed for the extraction. If desired, the extraction may be carried out in a closed apparatus, in which case it is possible to work at temperatures above the boiling point of the said mixtures under atmospheric pressure.

The sulphonation of the alcohol containing mixtures which may be carried out by means of concentrated sulphuric acid, fuming sulphuric acid, and more particularly chlorosulphonic acid, may be carried out at temperatures between about 0° C. and about 30° C., if desired in the presence of the aforesaid inert solvents, such as carbon tetrachloride, or diethyl ether, and/or of water absorbing agents such as acetic acid anhydride, and usually produces sulphuric esters of the initial alcohols, that means products in which one or more $SO_3H$ groups are connected to a carbon atom by means of an oxygen atom. The neutralization of the said sulphuric esters is preferably carried out by incorporating the sulphonation mixture with a concentrated aqueous solution of caustic soda. The neutralized crude sulphonation product thus obtained is usually mixed with from 3 to 5, preferably with 4 times its weight of a mixture of about equal parts by weight of water and of one of the aforesaid low molecular alcohols or acetone, the whole mixture being then subjected to extraction by means of its own volume of the aforesaid extracting hydrocarbons, this extraction being repeated one, or if desired, two times with the same quantity of extracting hydrocarbons. Of course the extraction may be repeated still one or several times again, but usually 2 or 3 extractions are sufficient for practically completely freeing the neutralized sulphonation product from all foreign substances. If desired, the extraction may be carried out continuously by allowing the mixture of neutralized crude sulphonation products with water and alcohol or acetone to flow downwards through a tower packed with compact filler bodies such as balls made from quartz, glass or another ceramic material, or gravel, at the bottom of which tower a current of the said extracting hydrocarbons is led upwards. The resulting solution of the non-sulphonated and non-sulphonatable products in the hydrocarbons is then withdrawn at the top of the tower, whilst the solution of the pure sulphonates is withdrawn at the foot.

The resulting solutions are preferably evaporated, the vapours being then condensed and returned to the apparatus, the recovered hydrocarbons being directly used for a new extraction and the mixture of water and alcohol or acetone being used for a new charge of neutralized sulphonation product.

In this manner assistants for the textile and allied industries are obtained which are considerably improved in comparison with the crude products known hitherto and obtainable without the said extraction.

It is sometimes advantageous to carry out the sulphonation with less than the calculated amount of chlorosulphonic acid, for example with about 90 per cent of chlorosulphonic acid, calculated with respect to the hydroxyl number of the alcohol mixture. In this way it is possible to avoid the sulphonation of alcohols having a number of carbon atoms above, say, 20 or 25, when it is desired to produce sulphuric esters of alcohols containing for example between 12 and 18 carbon atoms in their molecule.

The following examples will further illustrate the nature of this invention, but the invention is not restricted to these examples. The parts are by weight.

Example 1

A liquid phase oxidation product of soft paraffin wax (melting point 44° C.) having an acid number of about 80 and containing about 50 per cent of unsaponifiable material, is saponified at 150° C. in an autoclave by means of aqueous caustic soda, the resulting soap solution being separated from the unsaponifiable constituents by extraction with gasoline. After evaporation of the solution from the gasoline extract, 150 parts of the unsaponifiable portion thus obtained, which has a hydroxyl value of 40, is subjected to sulphonation at about 20° C. by the action of chlorosulphonic acid in a quantity corresponding to 90 per cent of the amount corresponding to the hydroxyl value of said product. The crude sulphonation product is neutralized by means of a 25 per cent aqueous caustic soda solution and then incorporated with 400 parts of water. 130 parts of ethyl alcohol are then added to the mixture and the whole is subjected at 50° C. to extraction with 250 parts of a gasoline fraction boiling between 65° and 95° C., this extraction being twice repeated with the said same quantities of fresh gasoline. The aqueous solution of the purified and neutralized mixture of sulphuric esters is evaporated at 100° C. until its water content is about 4 per cent.

The mixture of sodium salts of sulphuric esters thus obtained is an excellent washing agent, for example for loose wool. The non-sulphonated and non-sulphonatable components recovered by evaporation of the gasoline may be anew subjected to said liquid phase oxidation.

Example 2

A liquid phase oxidation product of hard paraffin wax (melting point 52° to 54° C.) having an acid number of 100 and containing about 40 per cent of unsaponifiable constituents is saponified at 150° C. in an autoclave by means of an aqueous 20 per cent caustic soda solution, the unsaponifiable constituents being separated from the soaps by extraction with gasoline. The soap solution is then acidified by means of a 50 per cent aqueous sulphuric acid and the resulting mixture of carboxylic acids in purified by distillation. The purified acids are then subjected to catalytic hydrogenation according to the aforesaid application Ser. No. 486,280.

The hydrogenated product constitutes a mixture of alcohols of high molecular weight with carboxylic acids, aldehydes, ketones and the like. This mixture is dissolved in its own weight of carbon tetrachloride and sulphonated by means of 90 per cent of chlorosulphonic acid, calculated on the hydroxyl number. The sulphonated mixture is neutralized with a 25 per cent aqueous caustic soda solution, incorporated with 4 times its weight of a mixture of equal parts of water and methyl alcohol, and the whole is subjected 3 times to extraction with its own volume of a gasoline fraction boiling between 65° and 95° C., at a temperature of 60° C., in the manner described in Example 1.

The pure sodium salts of alcohol sulphuric esters thus obtained after evaporating the aqueous methyl alcoholic solution exert an excellent washing action on piece goods, loose wool and the like.

Instead of catalytically hydrogenating the carboxylic acids the whole crude oxidation product may be directly hydrogenated and then sulphonated, and worked up in the aforesaid manner, most valuable washing agents being also obtained in this case, since all the non-sulphonated and non-sulphonatable matter is removed from the neutralized sulphuric esters.

Example 3

The following table shows the effect of purification obtainable by extraction, according to the present invention, on neutralized sulphonation products of different alcohols. The amount of non-sulphonated and non-sulphonatable material removed in each case is a proof of the considerable improvement obtainable according to the present invention, which allows of obtaining, from crude, commercial products, pure sulphuric esters, the washing properties of which are far above those of the commercial sulphuric esters hitherto available.

2. The process for the production and purification of products reacted with sulphonating agents, which comprises subjecting alcohols containing from 10 to 25 carbon atoms to the action of a sulphonating agent, after removal of any saponifiable constituents, neutralizing the resulting products by means of a caustic alkali, mixing the neutralized products with water, incorporating the aqueous mixture with a water-soluble solvent, selected from the group consisting of alcohols and ketones containing from 1 to 3 carbon atoms, and subjecting the resulting mixture to extraction with a water-insoluble solvent, selected from the group consisting of liquid hydrocarbons and chlorinated hydrocarbons having a boiling point below 200° C., thereby freeing the neutralized products reacted with the said sulphonating agent from matter not reacted with and not capable of reacting with sulphonating agents.

3. The process for the production and purification of products reacted with sulphonating agents, which comprises subjecting alcohols containing from 10 to 25 carbon atoms to the action of chlorosulphonic acid, neutralizing the resulting products by means of a caustic alkali, mixing the neutralized products with water, incorporating the aqueous mixture with a water-soluble solvent, selected from the group consisting of

Table

| Initial alcohol | Quantity of chlorosulphonic acid, calculated with respect to the hydroxyl value | Temperature of sulphonation | Sodium salt of sulphonation product mixed with 4 times its weight of a mixture of equal parts of | Extracting agent | Extracted | Non-sulphonated matter removed (in % of the crude neutralized product) |
|---|---|---|---|---|---|---|
| Commercial cetyl alcohol | 100% | 15° C. | Methanol and water. | Petrol ether (boiling between 30° and 50° C.). | 3 times | 10 |
| Mixtures of alcohols obtained by catalytic hydrogenation of coconut oil. | 100% | 20° C. | Ethanol and water. | Gasoline fraction boiling between 65° and 95° C. | 2 times | 5 |
| Hydrogenation product of a liquid phase oxidation product of paraffin wax (hydroxyl number 220). | 90% | 15° C. | Ethanol and water. | Gasoline fraction boiling between 65° and 95° C. | 3 times | 25 |

What we claim is:—

1. The process for the production and purification of products reacted with sulphonating agents, which comprises subjecting alcohols containing from 10 to 25 carbon atoms to the action of a sulphonating agent, neutralizing the resulting products by means of a caustic alkali, mixing the neutralized products with water, incorporating the aqueous mixture with a water-soluble solvent, selected from the group consisting of alcohols and ketones containing from 1 to 3 carbon atoms, and subjecting the resulting mixture to extraction with a water-insoluble solvent, selected from the group consisting of liquid hydrocarbons and chlorinated hydrocarbons having a boiling point below 200° C., thereby freeing the neutralized products reacted with the said sulphonating agent from matter not reacted with and not capable of reacting with sulphonating agents.

alcohols and ketones containing from 1 to 3 carbon atoms, and subjecting the resulting mixture to extraction with a water-insoluble solvent, selected from the group consisting of liquid hydrocarbons and chlorinated hydrocarbons having a boiling point below 200° C., thereby freeing the neutralized products reacted with the said sulphonating agent from matter not reacted with and not capable of reacting with sulphonating agents.

4. The process for the production and purification of products reacted with sulphonating agents, which comprises subjecting alcohols containing from 10 to 25 carbon atoms to the action of chlorosulphonic acid, neutralizing the resulting products by means of a concentrated aqueous solution of a caustic alkali, mixing the neutralized products with water, incorporating the aqueous mixture with a water-soluble solvent, selected from the group consisting of alcohols and ketones containing from 1 to 3 carbon atoms, and subjecting the resulting mixture to extraction with a water-insoluble solvent, selected from the group consisting of liquid hydrocarbons and chlorinated hydrocarbons having a boiling point below 200° C., thereby freeing the neutralized products reacted with the said sulphonating agent from matter not reacted with and not capable of reacting with sulphonating agents.

5. The process for the production and purification of products reacted with sulphonating agents, which comprises subjecting alcohols containing from 10 to 25 carbon atoms to the action of chlorosulphonic acid, neutralizing the resulting products by means of a concentrated aqueous solution of caustic soda, mixing the neutralized products with water, incorporating the aqueous mixture with a water-soluble solvent, selected from the group consisting of alcohols and ketones containing from 1 to 3 carbon atoms, and subjecting the resulting mixture to extraction with a water-insoluble solvent, selected from the group consisting of liquid hydrocarbons and chlorinated hydrocarbons having a boiling point below 200° C., thereby freeing the neutralized products reacted with the said sulphonating agent from matter not reacted with and not capable of reacting with sulphonating agents, and evaporating the aqueous solution.

6. The process for the production and purification of products reacted with sulphonating agents, which comprises subjecting alcohols containing from 10 to 25 carbon atoms, obtainable by the liquid phase oxidation of paraffin hydrocarbons, to the action of chlorosulphonic acid, after removal of any saponifiable constituents, neutralizing the resulting products by means of a concentrated aqueous solution of caustic soda, mixing the neutralized products with water, incorporating the aqueous mixture with a water-soluble solvent, selected from the group consisting of alcohols and ketones containing from 1 to 3 carbon atoms, and subjecting the resulting mixture to extraction with a water-insoluble solvent, selected from the group consisting of liquid hydrocarbons and chlorinated hydrocarbons having a boiling point below 200° C., thereby freeing the neutralized products reacted with the said sulphonating agent from matter not reacted with and not capable of reacting with sulphonating agents, and evaporating the aqueous solution.

7. The process for the production and purification of products reacted with sulphonating agents, which comprises subjecting alcohols containing from 10 to 25 carbon atoms, obtainable by the liquid phase oxidation of paraffin hydrocarbons and subsequent hydrogenation of the oxidation products to the action of chlorosulphonic acid, after removal of any saponifiable constituents, neutralizing the resulting products by means of a concentrated aqueous solution of caustic soda, mixing the neutralized products with water, incorporating the aqueous mixture with a water-soluble solvent, selected from the group consisting of alcohols and ketones containing from 1 to 3 carbon atoms, and subjecting the resulting mixture to extraction with a water-insoluble solvent, selected from the group consisting of liquid hydrocarbons and chlorinated hydrocarbons having a boiling point below 200° C., thereby freeing the neutralized products reacted with the said sulphonating agent from matter not reacted with and not capable of reacting with sulphonating agents, and evaporating the aqueous solution.

8. The process for the production and purification of products reacted with sulphonating agents, which comprises subjecting alcohols containing from 10 to 25 carbon atoms, obtainable by catalytic reduction of aliphatic carboxylic acids and esters thereof, to the action of chlorosulphonic acid, neutralizing the resulting products by means of a concentrated aqueous solution of caustic soda, mixing the neutralized products with water, incorporating the aqueous mixture with a water-soluble solvent, selected from the group consisting of alcohols and ketones, containing from 1 to 3 carbon atoms, and subjecting the resulting mixture to extraction with a water-insoluble solvent, selected from the group consisting of liquid hydrocarbons and chlorinated hydrocarbons having a boiling point below 200° C., thereby freeing the neutralized products reacted with the said sulphonating agent from matter not reacted with and not capable of reacting with sulphonating agents, and evaporating the aqueous solution.

MARTIN LUTHER.
ADOLF v. FRIEDOLSHEIM.

DISCLAIMER 1,993,375.—*Martin Luther*, of Mannheim, and *Adolf v. Friedolsheim*, Ludwigshafen-on-the-Rhine, Germany. PRODUCTION AND PURIFICATION OF SULPHONATED PRODUCTS. Patent dated March 5, 1935. Disclaimer filed August 4, 1936, by the assignee, *I. G. Farbenindustrie Aktiengesellschaft*.

Hereby enters this disclaimer to that part of claims 1 to 8 incl. in said specification which is in the following words, to wit: "alcohols and" (see claim 1, line 10, claim 2, line 11, claim 3, line 10, claim 4, line 10, claim 5, lines 10–11, claim 6, line 13, claim 7, line 14, claim 8, line 12.)

[*Official Gazette August 25, 1936.*]

DISCLAIMER 1,993,375.—*Martin Luther*, of Mannheim, and *Adolf v. Friedolsheim*, Ludwigshafen-on-the-Rhine, Germany. PRODUCTION AND PURIFICATION OF SULPHONATED PRODUCTS. Patent dated March 5, 1935. Disclaimer filed August 4, 1936, by the assignee, *I. G. Farbenindustrie Aktiengesellschaft*.

Hereby enters this disclaimer to that part of claims 1 to 8 incl. in said specification which is in the following words, to wit: "alcohols and" (see claim 1, line 10, claim 2, line 11, claim 3, line 10, claim 4, line 10, claim 5, lines 10–11, claim 6, line 13, claim 7, line 14, claim 8, line 12.)

[*Official Gazette August 25, 1936.*]